United States Patent
Levine

(10) Patent No.: US 7,559,537 B1
(45) Date of Patent: Jul. 14, 2009

(54) DIRECT STEAM INJECTION HEATER WITH INTEGRATED REACTOR AND BOILER

(75) Inventor: Bart Levine, Boise, ID (US)

(73) Assignee: Green Energy Live, Inc., Wyoming, MI (US)

( * ) Notice: Subject to any disclaimer, the term of this patent is extended or adjusted under 35 U.S.C. 154(b) by 71 days.

(21) Appl. No.: 11/877,059

(22) Filed: Oct. 23, 2007

(51) Int. Cl.
*B01F 3/04* (2006.01)

(52) U.S. Cl. ............... 261/77; 261/94; 261/152; 261/155; 261/DIG. 10

(58) Field of Classification Search ............ 261/77, 261/94–98, 152, DIG. 10, DIG. 13, DIG. 32, 261/DIG. 76, 155, DIG. 31; 127/28, 71
See application file for complete search history.

(56) References Cited

U.S. PATENT DOCUMENTS

| | | | | |
|---|---|---|---|---|
| 642,460 | A * | 1/1900 | Kersten | 210/196 |
| 1,152,458 | A * | 9/1915 | Waggoner | 127/12 |
| 1,964,838 | A * | 7/1934 | Weinberg | 261/77 |
| 2,315,226 | A * | 3/1943 | Rohlin | 122/459 |
| 2,582,198 | A * | 1/1952 | Etheridge | 127/28 |
| 2,798,794 | A * | 7/1957 | Muench et al. | 422/224 |
| 3,197,337 | A * | 7/1965 | Schink | 127/28 |
| 3,219,483 | A * | 11/1965 | Goos et al. | 127/28 |
| 3,224,170 | A * | 12/1965 | Iwanaga et al. | 96/342 |
| 3,424,613 | A * | 1/1969 | Huber et al. | 127/28 |
| 3,450,022 | A * | 6/1969 | Engel | 99/453 |
| 3,452,966 | A * | 7/1969 | Smolski | 261/77 |
| 3,847,748 | A * | 11/1974 | Gibson et al. | 435/247 |
| 3,852,384 | A * | 12/1974 | Bearden | 261/77 |
| 4,256,771 | A * | 3/1981 | Henderson et al. | 426/250 |
| 2006/0237859 | A1 * | 10/2006 | Lopez et al. | 261/76 |

FOREIGN PATENT DOCUMENTS

GB 2249969 A * 5/1992 ............ 261/77

* cited by examiner

*Primary Examiner*—Richard L Chiesa
(74) *Attorney, Agent, or Firm*—Dykas, Shaver & Nipper, LLP

(57) ABSTRACT

Disclosed is an apparatus for heating a viscous liquid slurry by direct steam injection in small scale installations. A process tube, through which the slurry flows, is surrounded by a pressure vessel. The pressure vessel acts as a high pressure steam boiler tank, heating the process tube. The process tube, having a length to accommodate mixing of the slurry within, act as a reaction chamber, into which steam is injected via a direct steam injection assembly. The integration of the injector, reactor, and boiler avoids the need for an external boiler and associated plumbing.

8 Claims, 2 Drawing Sheets

DIRECT STEAM INJECTION HEATER WITH INTEGRATED REACTOR AND BOILER

FIELD OF THE INVENTION

The invention relates generally to a direct steam injection apparatus for gas and liquid contact, and more particularly to a direct steam injection apparatus having an integrated reactor and boiler for starch liquefaction.

DESCRIPTION OF RELATED ART

U.S. Pat. No. 3,197,337, issued to N. F. Schink, teaches a starch heater apparatus that includes a diffusing steam distributor and a T-tube design for heating viscuous process liquid by directly mixing the liquid with steam. The steam is introduced to the device from a remote location.

U.S. Pat. No. 3,424,613, issued to K. J. Huber, et al., teaches an apparatus for the continuous production of starch pastes. It outlines an apparatus having a reaction tube downstream from a steam injection heater wherein a process slurry continues to be affected by heating while heat loss is retarded by insulation. The '613 apparatus teaches a component approach to process system integration, using a long pipe path and remote heating sources.

BACKGROUND OF THE INVENTION

During the process of preparing ethanol from starches, such as those found in corn grain, the carbohydrates comprising the starches must undergo a number of process stages so as to prepare a saccharide, such as glucose, for final fermentation. These stages include "extraction," "cooking," "conversion," and "sterilization," followed by cooling and fermentation. The extraction, cooking, conversion, and sterilization stages can be efficiently accomplished on a continuous basis using a steam injection device known as a "jet cooker" for the "cooking" stage. The "jet cooker" was adopted from the paper pulp processing industry.

Approximately 150 psi of steam is necessary for starch cooking. Steam boilers capable of producing the 150 psi of steam are expensive, heavy, and dangerous. Proper operation of these steam boilers often requires advanced knowledge or certification of proper construction, operation, and installation procedures. Further, given the high amount of pressure necessary for cooking, including for jet cooking, the technique of continuous jet cooking for small or portable fermentation process installations has been unavailable. Accordingly, the benefits of continuous direct stream injection cookers has been solely the privilege of large processing plants where the cookers have capacities characterized by pipe diameters of larger than two-and-one-half inches. There is a need for a jet cooker apparatus that is available for small or portable fermentation process installations, and, particularly, to have a jet cooker apparatus available for smaller, remote processors working in a scale as small as one-and-one-fourth inch pipe diameters.

Further, prior art steam heaters for transporting and converting vegetable starch do not teach an integrated system containing the three necessary components for jet cooking, i.e., an injector, a reactor, and a boiler. Rather, the prior art apparatuses use a non-integrated boiler to generate the steam to be injected into a process tube, that acts as a reactor in which the process fluid cooks. There is a need for a heater that is an integrated system of the three necessary components so as to accommodate small-scale processes.

SUMMARY OF THE INVENTION

Embodiments of the present direct steam injection heater apparatus provide a low cost, portable, safe, simple, and more efficient, integrated solution to heating a viscuous liquid slurry.

The direct steam injection heater accomplishes heat transfer to a process fluid traveling through the heater in the heater's process tube. The heat transfer is accomplished by two methods. First, the process fluid is heated upon contact with steam that is directly injected into the process fluid. Upon injection, the steam mixes with the process fluid. Second, the process fluid is heated by heat conducted through the process tube from the exterior of the process tube, which is affected by the condensation of steam and the liberated heat absorbed by the process material within the process tube.

During the heating steps, the process tube acts as a heated reaction tube. In one embodiment, the process tube contains a static mixer insert. In a particular configuration of this embodiment, the static mixer insert is composed of static banks of trapezoidal mixing elements.

In other embodiments, the process fluid may also be heated by multiple external heating methods, such as by use of an electric tape heater, direct firing, oil bath submersion, or radiation, to name a few.

Embodiments of the present direct steam injection heater also extend retention time of the process fluid in the externally and internally heated process tube. By externally heating the process tube and extending retention time, a lower steam temperature is required than would be required to achieve the same heating effect by direct steam injection heating in an unheated process tube of an extended heat exchanger. Extending the retention time further reduces the thermal degradation of delicate process material in the process fluid, which is a risk when process fluid travels from high temperatures in a mixing zone to the cooler temperatures of an unheated process tube. Further, heating the process tube reduces the unwanted gelling often associated with an unheated process tube.

Embodiments of the present direct steam injection heater also integrate the three components of jet cooking, i.e., the injector, reactor, and boiler, by enclosing the process tube in a high pressure steam boiler tank. The boiler tank encases the process tube, which functions as the reactor, and the injector, thus integrating the three components of the jet cooker. By wrapping the boiler around the process tube, the external surface of the process tube and the injection mechanism are exposed to condensing steam. This configuration reduces the need for potentially-dangerous, expensive, and complicated connecting plumbing that would accompany live steam and condensate trapping, as well as eliminating the need for turbine pumping.

The purpose of the foregoing Summary is to enable the public, and especially the scientists, engineers, and practitioners in the art who are not familiar with patent or legal terms or phraseology, to determine quickly from a cursory inspection, the nature and essence of the technical disclosure of the application. The Summary is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

DESCRIPTION OF THE PREFERRED EMBODIMENTS

Figure 1:
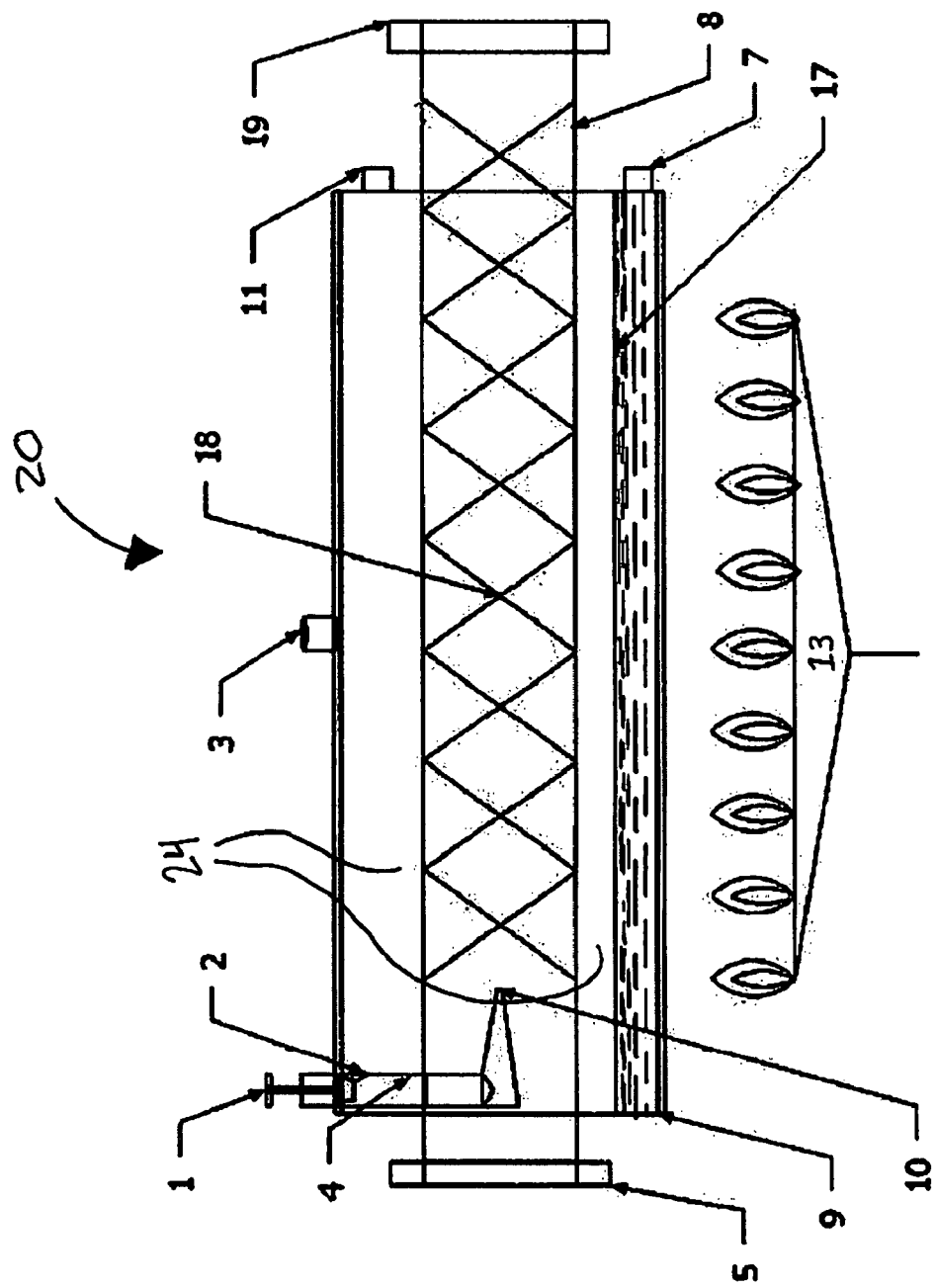
FIG. 1 is a right-side elevation view of a direct steam injection heater with integrated reactor and boiler according to an embodiment of the invention.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

As shown in the figures for purposes of illustration, the apparatus is embodied in a novel direct steam injection heater with integrated reactor and boiler that allows for smaller-scale process use in a safe, simple, portable, and efficient integrated system.

In the following description and in the figures, like elements are identified with like reference numerals. The use of "or" indicates a non-exclusive alternative without limitation unless otherwise noted. The use of "including" means "including, but not limited to," unless otherwise noted.

Figure 2:
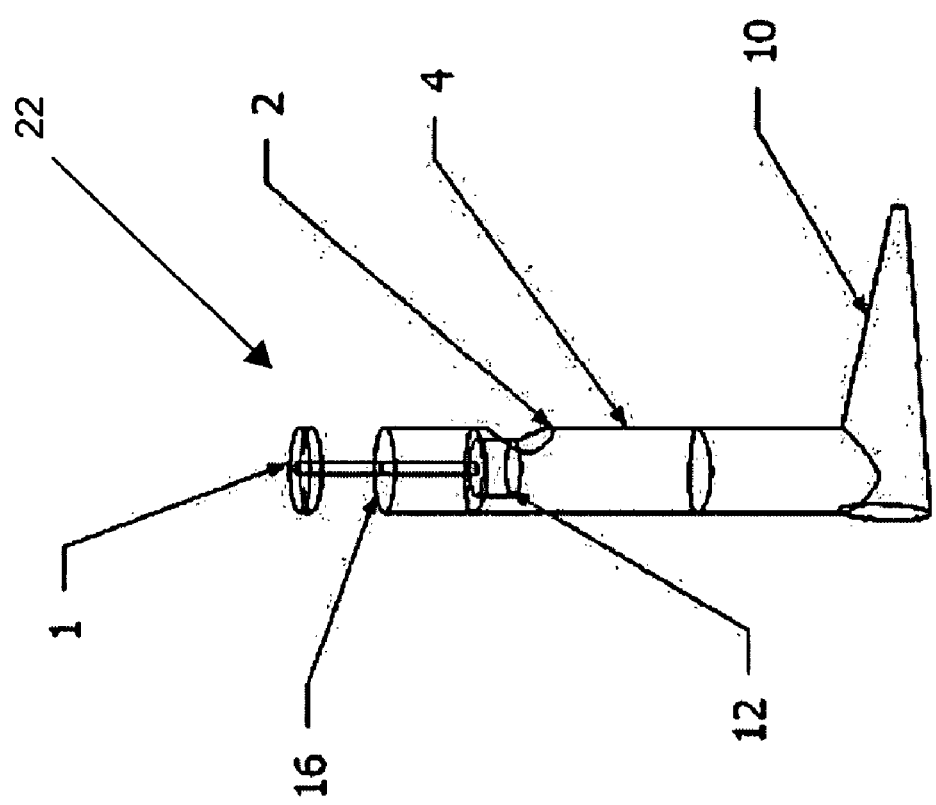
FIG. 2 is a right-side elevation view of a component of the direct steam injection heater with integrated reactor and boiler according to the embodiment in FIG. 1.

An embodiment of a direct steam injection heater with integrated reactor and boiler 20 is shown in FIGS. 1 and 2. The heater 20 comprises two coaxial tubes of a process tube 8 and a pressure vessel 9, preferably positioned longitudinally horizontal so that heating liquid condensate 17 contained within the pressure vessel 9 are able to collect within the pressure vessel 9. It is preferred that the process tube 8 be of the minimum wall thickness necessary to adequately resist collapse due to external steam pressure acting upon it while minimizing the conductive heat path through the tubing wall. Further, the process tube 8 should be of a minimum diameter to allow adequate transportation of process mass flow while accommodating the expansion of steam injected into process liquid with consideration given to the displacement of a direct steam injector assembly 22, located partially within the process tube 8. Still further, the process tube 8 should be of a length necessary to adequately retain the process fluid for a period of time for continuous heat absorption and mixing, during which the process tube 8 acts as an absorbing heat exchanger. Still further, the process tube 8 should be composed of a material strong enough to accommodate the heat and force of pressurized steam, with properties resistant to corrosion and softening from steam and the contained process fluid, thermal conduction properties adequate to transfer heat of condensing steam through the material to the process fluid, thermal expansion properties adequate to withstand temperature differentials between the process fluid and high pressure steam, and capable of being formed and joined to additional material into an assembly of adequate strength to contain high steam pressure. Accordingly, it is preferred that the process tube 8 be constructed from welded stainless steel.

The process tube 8 has a process fluid inlet 5, through which process fluid to be heated and mixed enters the process tube 8, and a process fluid outlet 19, through which process fluid that has been heated and mixed exits the process tube 8. In the embodiment shown in FIG. 1, a static mixing element 18 is enclosed within the process tube 8.

The process tube 8 is surrounded by the pressure vessel 9, which is sealed upon the process tube 8 thereby creating an envelope 24 between the process tube 8 and the pressure vessel 9. The envelope 24 acts as both a steam heating jacket and a steam boiler. External heat sources 13 are concentrated on the exterior of the pressure vessel 19.

It is preferred that the pressure vessel 9 be constructed of a similar material to the material used to construct the process tube 8 and be welded to the process tube at the extreme ends of the pressure vessel so as to form a seal capable of withstanding the resulting high pressure in the envelope 24 between the pressure vessel 9 and the process tube 8. The diameter of the pressure vessel 9 should be minimized to minimize the wall thickness necessary for containing the high pressure steam contained within the envelope 24 but of a diameter large enough to create an envelope of adequate configuration and volume to accommodate the accumulation of sufficient heating liquid condensate 17 within the pressure vessel 9 so as to allow the pressure vessel 9 to act as a boiler tank.

Attached to the pressure vessel 9 are a first external connection fitting 3, a second external connection fitting 7, and a third external connection fitting 11. The first external connection fitting 3 is located at the highest point of the pressure vessel 9 and is configured to allow venting, sensing, and measurement of live steam. It is preferred that the first external connection fitting 3 is configured to be of a size adequate for venting steam at a rate appropriate for the applied heat input. In some embodiments, the first external connection fitting 3 may be configured to allow attachment of a suitable pressure relief device (not shown).

The second external connection fitting 7 and the third external connection fitting 11 are configured to accommodate the function of an external water level control unit (not shown). Further, the second external connection fitting 7 is configured to allow for sensing of the level of the heating fluid condensate 17, and the third external connection fitting 11 is configured to allow for sensing of the steam pressure.

The embodiment of the direct steam injection heater with integrated reactor and boiler, as shown in FIGS. 1 and 2, also includes a direct steam injector assembly 22, comprising a vertically-arranged injector tube 4 that passes vertically from the interior of the process tube 8, through the envelope 24, through the pressure vessel 9, to the exterior of the pressure vessel.

The injector tube 4 defines a port 2 located in the section of the injector tube 4 that is between the process tube 8 and the pressure vessel 9. The port 2 is configured to accommodate the flow of steam through port 2 into the injector tube 4.

A steam flow rate throttle 1 is attached to the injector tube 4 at a section of the injector tube 4 located exterior to the pressure vessel 9. The steam flow rate throttle 1 is configured to accommodate adjustment of a throttling interference element 12, which is configured to accommodate control of the flow of steam through port 2 into the injector tube 4. A seal 16 is located inside the injector tube 4, between the steam flow rate throttle 1 and the throttling interference element 12. The seal 16 is configured to discourage leakage of steam to the exterior of the pressure vessel 9.

A steam diffuser 10 is attached to the injector tube 4 at the section of the injector tube 4 located within the process tube

8. The steam diffuser 10 is configured to accommodate passage of steam from the injector tube 4 to the interior of the process tube 8. It is preferred that the steam diffuser 10 be configured to accommodate down-stream flow of the steam passing from the injector tube 4 into the interior of the process tube 8.

In some embodiments the direct steam injector assembly 22 is configured so that the steam diffuser 10 is located center to the process tube 8, so as to allow steam to radially disperse from the center of the process tube 8.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A direct steam injection heater with integrated reactor and boiler, comprising:

a process tube having a process fluid inlet and a process fluid outlet, said process tube configured to accommodate a flow of process liquid while retaining said flow of process liquid for a period of time during which heat is transferred to said flow of process liquid, said process fluid inlet and said process fluid outlet configured to accommodate connection of said process tube with external process piping;

a pressure vessel surrounding said process tube, sealed thereto, and configured in relation to said process tube so as to define an envelope between said process tube and said pressure vessel, said pressure vessel and said envelope being configured to accommodate an amount of steam and an amount of heating liquid condensate within said pressure vessel, said pressure vessel having a pressure vessel exterior, said amount of heating liquid condensate having a condensate level;

at least one external heat source, configured so as to heat at least a portion of said pressure vessel exterior to accommodate heating of said amount of heating liquid condensate;

at least one direct steam injector assembly connected to said process tube, each of said direct steam injector assemblies configured so as to accommodate injection of at least a portion of said amount of steam into said process tube; said direct steam injector assembly comprising:

an injector tube, vertically-arranged, passing vertically from inside said process tube, through said envelope, and through said pressure vessel, to said pressure vessel exterior, said injector tube defining a port in said injector tube in a portion of said injector tube between said process tube and said pressure vessel, said port configured to accommodate a flow of said portion of said amount of steam from said envelope through said port into said injector tube;

a steam flow rate throttle attached to said injector tube at a portion of said injector tube outside said pressure tube exterior, said steam flow rate throttle being configured to accommodate adjustment of a throttling interference element, said throttling interference element being configured to accommodate control of said flow of said portion of said amount of steam through said port into said injector tube;

a seal inside said injector tube, located between said steam flow rate throttle and said throttling interference element, said seal being configured to discourage leakage of steam to said pressure vessel exterior; and a steam diffuser attached to said injector tube at a location of said injector tube within said process tube, said steam diffuser being configured to accommodate passage of said flow of said portion of said amount of steam from said injector tube into said process tube;

whereby said pressure vessel operates to heat said process tube while providing said amount of steam and whereby said process tube operates to allow heating and mixing of said flow of process fluid.

2. The direct steam injection heater with integrated reactor and boiler of claim 1, further comprising:

a static mixing element located within said process tube, said static mixing element configured to accommodate mixing of said flow of process liquid with said flow of said portion of said amount of steam.

3. The direct steam injection heater with integrated reactor and boiler of claim 2, wherein said static mixing element comprises static banks of trapezoidal mixing elements.

4. The direct steam injection heater with integrated reactor and boiler of claim 1, further comprising:

a first external connection fitting attached to said pressure vessel at a high point on said pressure vessel, said first external connection fitting being configured to accommodate venting, sensing, and measurement of said amount of steam;

a second external connection fitting attached to said pressure vessel and configured to accommodate sensing of said condensate level and to accommodate control of said condensate level by removal of at least a portion of said amount of heating liquid condensate;

a third external connection fitting attached to said pressure vessel and configured to accommodate sensing of said amount of steam and to accommodate control of pressure within said pressure vessel by accommodating venting of at least a portion of said amount of steam.

5. The direct steam injection heater with integrated reactor and boiler of claim 1, wherein said at least one direct steam injector assembly comprises a plurality of direct steam injector assemblies.

6. The direct steam injection heater with integrated reactor and boiler of claim 1, wherein said pressure vessel is configured, in relation to said process tube, so as to define said envelope in a manner that allows said amount of steam to surround said process tube.

7. The direct steam injection heater with integrated reactor and boiler of claim 1, wherein said at least one direct steam injector assembly is configured so that said steam diffuser of said at least one direct steam injector assembly is diametrically centered in said process tube, so as to accommodate said flow of said portion of said amount of steam to radially disperse within said process tube.

8. A direct steam injection heater with integrated reactor and boiler, comprising:

a process tube having a process fluid inlet and a process fluid outlet, said process tube configured to accommodate a flow of process liquid while retaining said flow of process liquid for a period of time during which heat is transferred to said flow of process liquid, said process fluid inlet and said process fluid outlet configured to accommodate connection of said process tube with external process piping;

a pressure vessel surrounding said process tube, sealed thereto, and configured in relation to said process tube so as to define an envelope between said process tube and said pressure vessel, said pressure vessel and said envelope being configured to accommodate an amount of steam and an amount of heating liquid condensate within said pressure vessel, said pressure vessel having a pressure vessel exterior, said amount of heating liquid condensate having a condensate level;

at least one external heat source, configured so as to heat at least a portion of said pressure vessel exterior to accommodate heating of said amount of heating liquid condensate;

a first external connection fitting attached to said pressure vessel at a high point on said pressure vessel, said first external connection fitting being configured to accommodate venting, sensing, and measurement of said amount of steam;

a second external connection fitting attached to said pressure vessel and configured to accommodate sensing of said condensate level and to accommodate control of said condensate level by removal of at least a portion of said amount of heating liquid condensate;

a third external connection fitting attached to said pressure vessel and configured to accommodate sensing of said amount of steam and to accommodate control of pressure within said pressure vessel by accommodating venting of at least a portion of said amount of steam;

a direct steam injector assembly connected to said process tube, said direct steam injector assembly configured so as to accommodate injection of at least a portion of said amount of steam into said process tube; said direct steam injector assembly comprising:

an injector tube, vertically-arranged, passing vertically from inside said process tube, through said envelope, and through said pressure vessel, to said pressure vessel exterior, said injector tube defining a port in said injector tube in a portion of said injector tube between said process tube and said pressure vessel, said port configured to accommodate a flow of said portion of said amount of steam from said envelope through said port into said injector tube;

a steam flow rate throttle attached to said injector tube at a portion of said injector tube outside said pressure tube exterior, said steam flow rate throttle being configured to accommodate adjustment of a throttling interference element, said throttling interference element being configured to accommodate control of said flow of said portion of said amount of steam through said port into said injector tube;

a seal inside said injector tube, located between said steam flow rate throttle and said throttling interference element, said seal being configured to discourage leakage of steam to said pressure vessel exterior; and a steam diffuser attached to said injector tube at a location of said injector tube within said process tube, said steam diffuser being configured to accommodate passage of said flow of said portion of said amount of steam from said injector tube into said process tube;

whereby said pressure vessel operates to heat said process tube while providing said amount of steam and whereby said process tube operates to allow heating and mixing of said flow of process fluid.

* * * * *